United States Patent [19]

Otteson et al.

[11] 4,192,399

[45] Mar. 11, 1980

[54] SAFETY VACUUM VALVE AND ELECTRIC SWITCH FOR SPEED CONTROL SYSTEMS

[75] Inventors: Jack O. Otteson; Eugene J. Martin, both of Hagerstown, Ind.

[73] Assignee: Dana Corporation, Toledo, Ohio

[21] Appl. No.: 666,405

[22] Filed: Mar. 12, 1976

[51] Int. Cl.² ............................................. B60K 31/00
[52] U.S. Cl. ............................. 180/170; 200/61.86; 200/61.89; 251/304; 192/3 M
[58] Field of Search ................. 180/108, 109, 105 R, 180/103 R; 200/61.89, 61.9, 61.6, 61.86, 6 BB

[56] References Cited

U.S. PATENT DOCUMENTS

| | | | |
|---|---|---|---|
| 1,785,366 | 12/1930 | Shoenberg | 200/61.89 X |
| 1,826,766 | 10/1931 | Gebhard | 200/61.86 X |
| 2,053,072 | 9/1936 | Farmer | 200/61.86 X |
| 2,277,457 | 3/1942 | Rook | 200/61.89 X |
| 3,198,280 | 8/1965 | Van Ostrom | 180/108 |
| 3,211,251 | 10/1965 | Parker | 180/108 |
| 3,322,912 | 5/1967 | Kuchta | 200/61.89 X |
| 3,431,997 | 3/1969 | Kauthekar | 180/108 |
| 3,462,571 | 8/1969 | Edwards | 200/61.89 |
| 3,794,147 | 2/1974 | Shellhause | 200/61.86 X |

FOREIGN PATENT DOCUMENTS 1076921 11/1954 France ............................ 200/6 BB

*Primary Examiner*—John P. Silverstrim
*Attorney, Agent, or Firm*—Emch, Schaffer, Schaub & Todd

[57] ABSTRACT

A brake or clutch pedal actuated safety switch for use with an automotive speed control system is disclosed. The switch opens an electric circuit and admits atmospheric air to a vacuum line when the brake pedal or clutch pedal is depressed. The electric circuit normally opens first to deactivate the speed control system electrically at the system's regulator, and the vacuum line is opened subsequently to act as a backup for deactivation of the system. A rotatably mounted lever member, biased by a spring toward the deactivating position, controls both the electric and the vacuum circuits. When the pedal is fully released and returned to its undepressed position, a tension line rotates the lever member against the bias of the spring to a position wherein the electric circuit and the vacuum line are closed.

8 Claims, 16 Drawing Figures

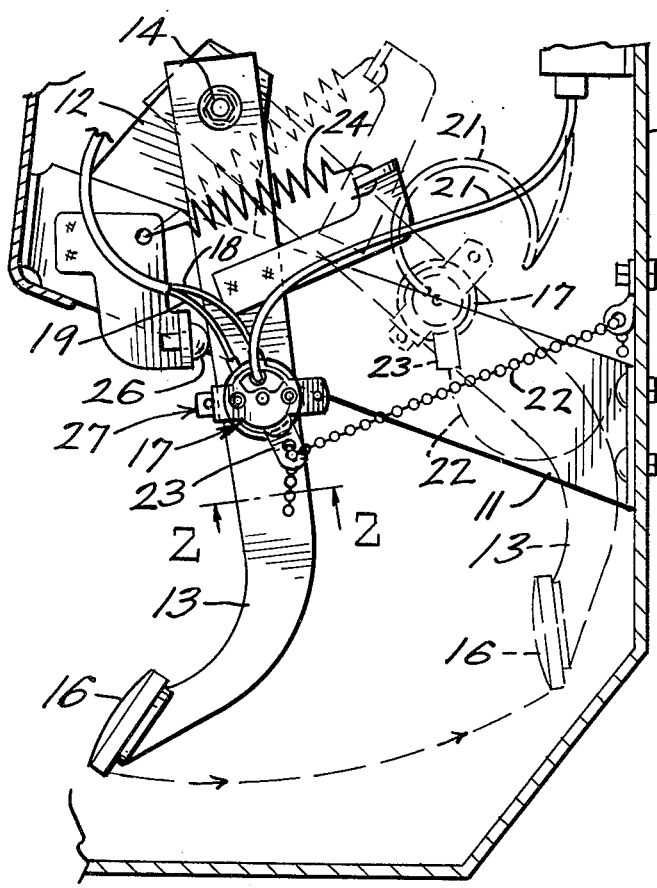
FIG-1-
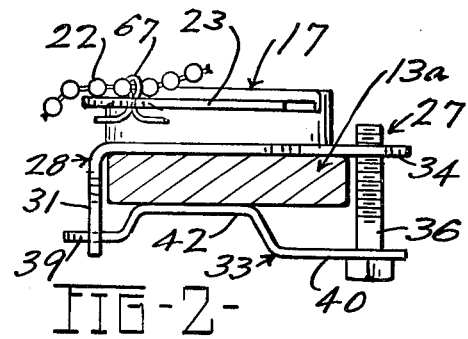
FIG-2-
FIG-3-
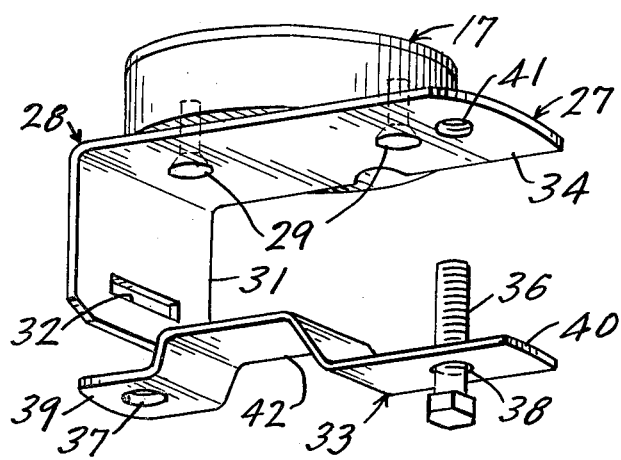
FIG-6-
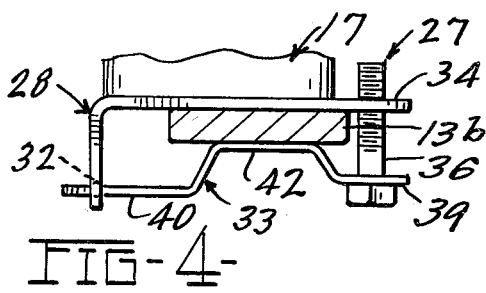
FIG-4-
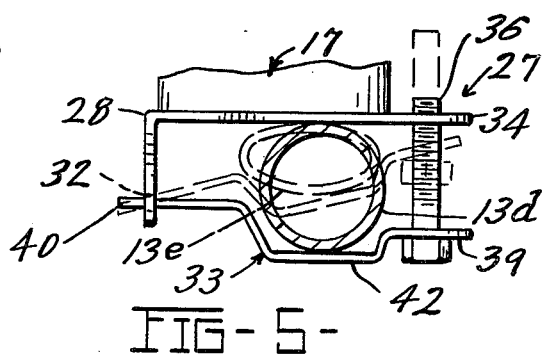
FIG-5-

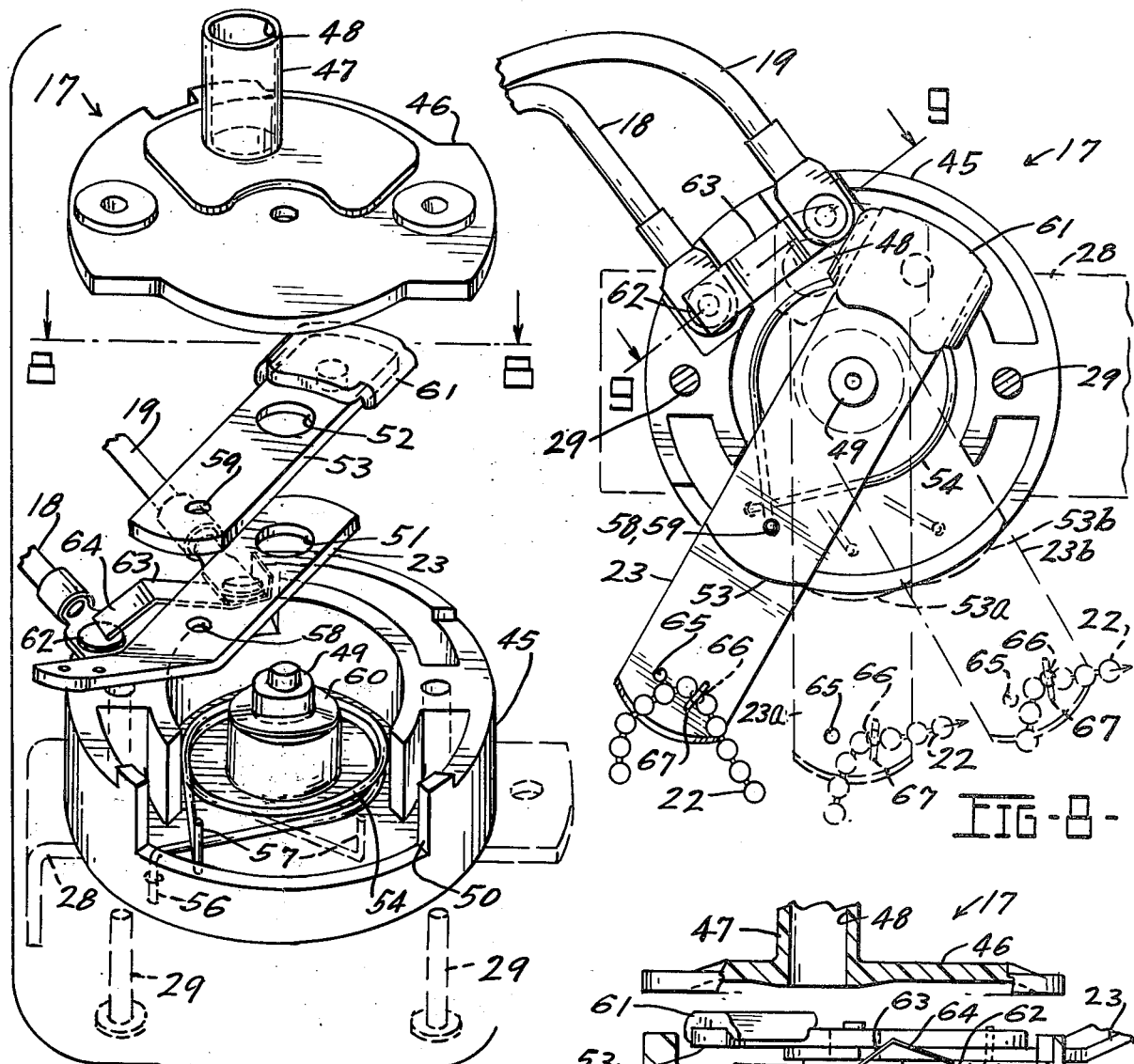
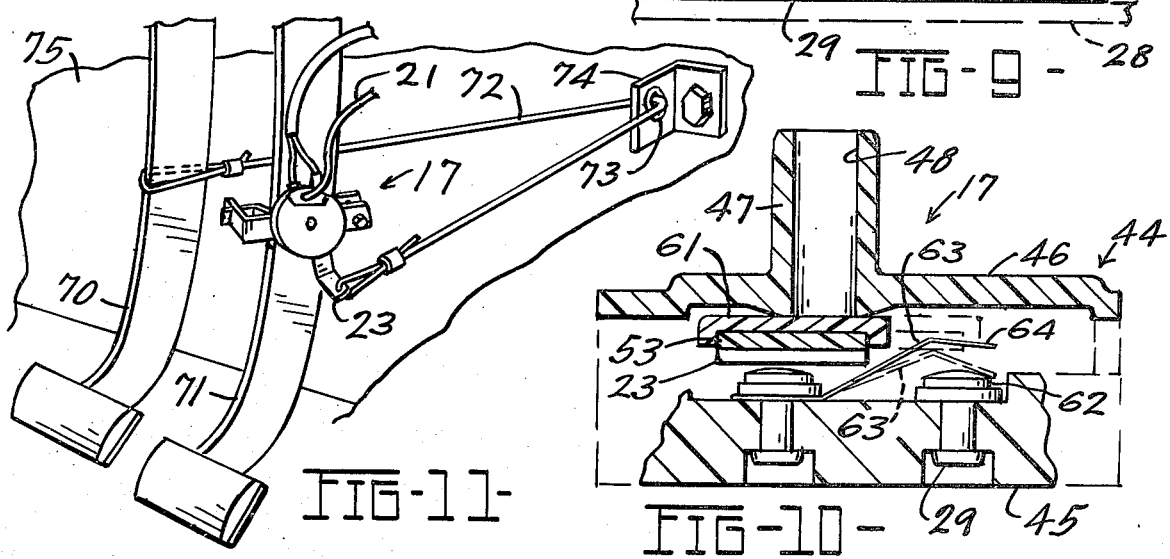

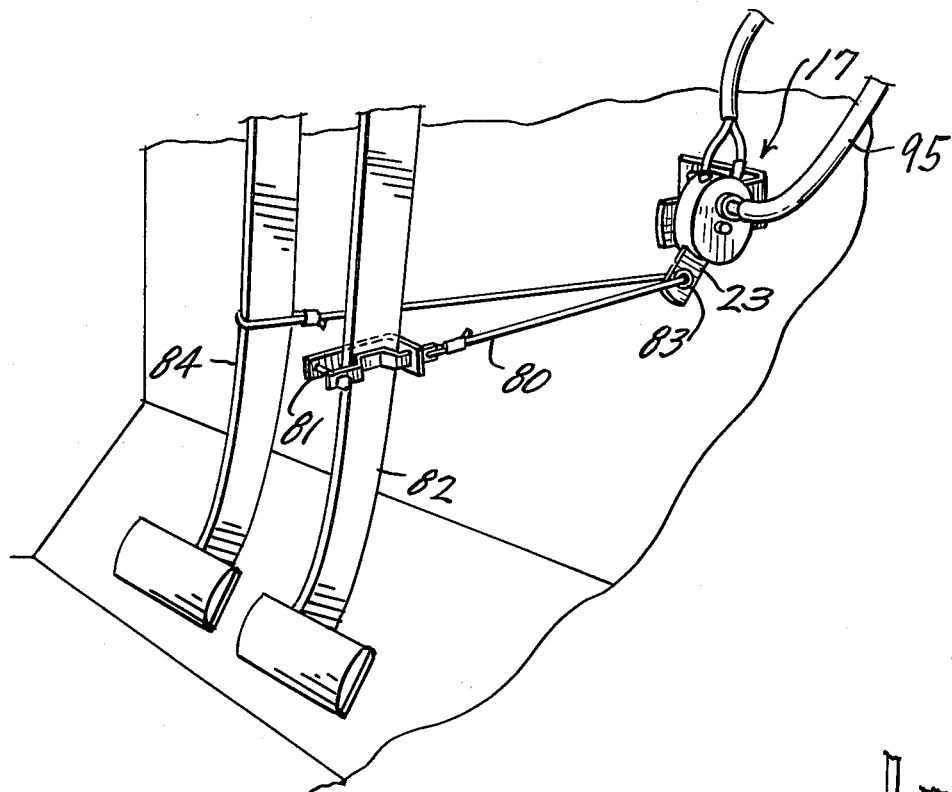
FIG-12-
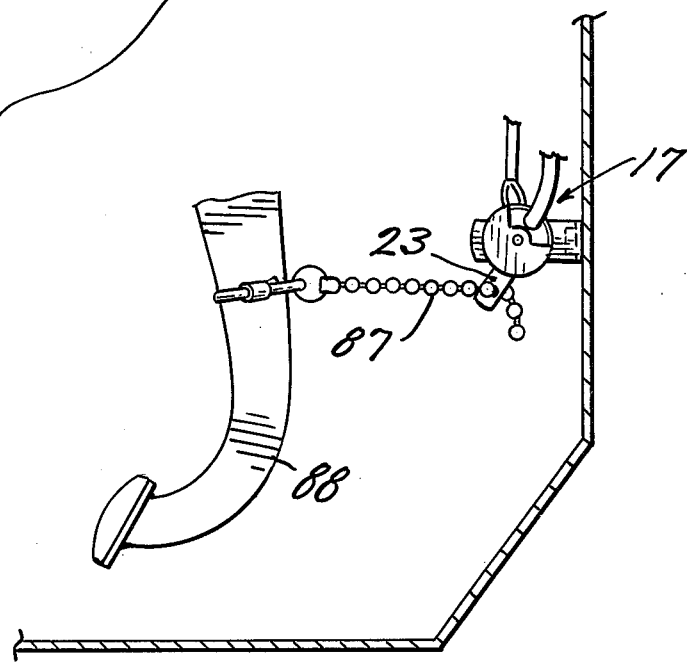
FIG-13-

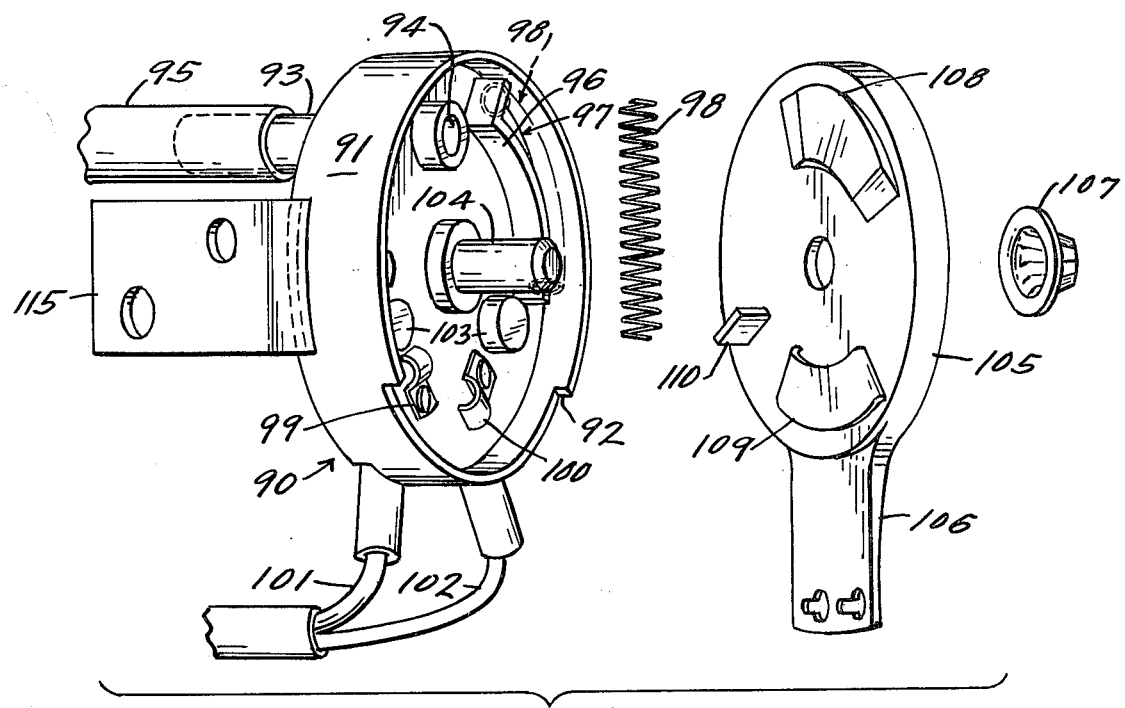
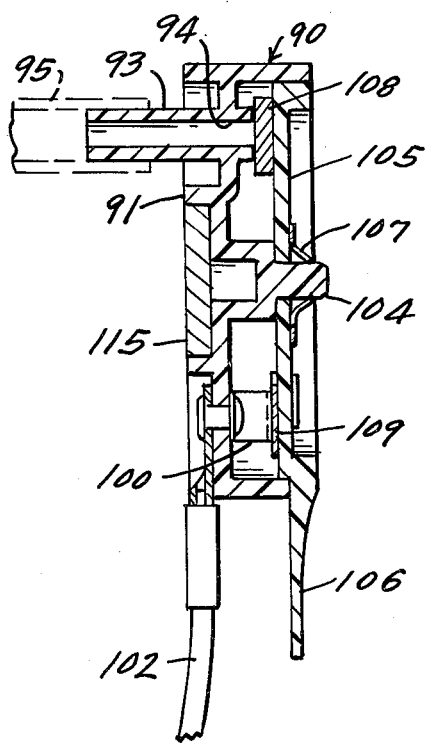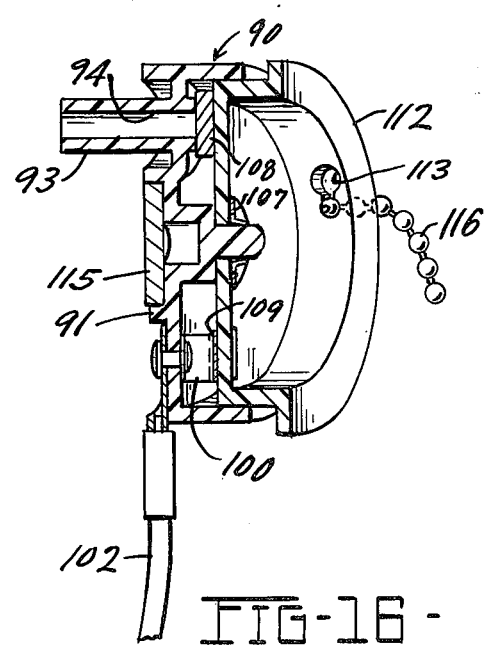

SAFETY VACUUM VALVE AND ELECTRIC SWITCH FOR SPEED CONTROL SYSTEMS

The invention relates to an automobile speed control deactivator switch, and more particularly to a safety device which opens an electric circuit and opens a vacuum circuit, both of which are associated with the speed control regulator, upon depression of the brake or clutch lever.

Numerous mechanisms for deactivating a speed control system upon depression of a vehicle brake or clutch pedal have been suggested. See, for example, U.S. Pat. Nos. 2,519,510, 3,275,029 and 3,794,147. All of these patents show means for interrupting the vacuum associated with a speed control system. The vacuum is normally incorporated in a circuit which controls the throttle of the vehicle engine. A regulator in the system generally shuts off vacuum at that end of the system in response to an electric signal. In U.S. Pat. No. 3,275,029, a vacuum circuit is blocked by a device associated with the brake pedal, while in U.S. Pat. Nos. 2,519,510 and 3,794,147, vacuum required for operation of the system is dumped to atmospheric pressure on application of the brake. In U.S. Pat. No. 3,794,147, the vacuum release acts as a backup for deactivation of the system, the primary deactivation control being an electric switch also associated with the brake-activated device. Although the device of this latter patent performs the functions of interrupting vacuum and an electric circuit associated with a speed control system, the structure of the patented device is very different from that of the present invention described below.

The present invention is a compact, inexpensive and fail-safe speed control switch for attachment to the fire wall, the clutch pedal or the brake lever of a vehicle. One embodiment of the switch unit includes a pivoted lever having an end which closes a vacuum port and closes an electric switch when the lever is rotated toward its activating position. This occurs upon return of the brake pedal from its depressed position. When the brake pedal is released, it is returned by its return spring to its full outward position, thereby tensioning a chain connected at one end to a fixed member and at the other end to the pivoted switch lever and rotating the switch lever to its position of engagement with the vacuum port and the electric switch. When the pedal is again depressed, the tension chain relaxes and the switch lever is rotated to the deactivating position under the influence of a torsion spring. The electric switch and the vacuum port are thus both opened. In a preferred form of the safety switch, the electric switch is opened first, so that the speed control system regulator with which the circuit is associated first shuts off operating vacuum at the regulator end of the system, in response to the interruption of the circuit. At the regulator, a solenoid operated valve is often provided in the vacuum source line, operable to shut off vaccum by closing the line when the solenoid is de-energized. This solenoid operated valve may be in the circuit of the safety electric switch. Thus, when the vacuum port of the safety switch is uncovered, vacuum normally has already been cut off, and airborne dust from the passenger compartment of the vehicle does not enter the vacuum line for passage through the speed control system into the engine. Similarly, the vacuum port is closed before closing of the electric switch in the preferred form of the invention.

Should the electric deactivator switch or the circuit in which it is incorporated fail to cut off vacuum at the system's regulator, as if a short exists in the circuit, and the system continues to be energized, the backup vacuum release feature of the safety switch will dump vacuum and the system will in this way be deactivated.

Since the double control safety switch of the invention is biased toward its deactivating position, it is essentially fail-safe. For example, if the tension chain or line connected to the switch lever should break, the speed control system would be immediately shut off. Thus, the ability to activate the speed control system, rather than the ability to deactivate the system, would be lost.

By its construction, the speed control safety switch of the invention is also small, compact, inexpensive to manufacture and readily installed in a vehicle. The safety switch can also be installed on any handle, lever or piston controlled system which utilizes an electrical device to open or close a valve and which also utilizes vacuum or air pressure to operate the system.

FIG. 1 is an elevational view showing the safety switch of the invention installed on a clutch or brake pedal lever of an automobile;

FIG. 2 is a sectional view taken along the line 2—2 of FIG. 1, showing a universal mounting bracket for connecting the safety switch to the pedal lever;

FIG. 3 is a view similar to FIG. 2, showing the universal bracket mounted on a different size pedal lever;

FIG. 4 is a view similar to FIG. 2, showing the universal bracket mounted on a third pedal lever;

FIG. 5 is a view similar to FIG. 2, showing the universal bracket mounted on a fourth pedal lever;

FIG. 6 is a view showing the two components of the universal mounting bracket and indicating the manner of assembly;

FIG. 7 is an exploded view of the safety switch;

FIG. 8 is a view taken along the line 8—8 of FIG. 7;

FIG. 9 is a sectional view taken along the line 9—9 of FIG. 8;

FIG. 10 is a sectional view similar to FIG. 9 with the safety switch fully assembled, indicating the operation of the switch;

FIG. 11 is a fragmentary perspective view showing the safety switch of the invention installed in an automobile having a standard transmission;

FIG. 12 is a view similar to FIG. 11, showing the base of the safety switch of the invention installed on a portion of a vehicle spaced from the pedals;

FIG. 13 is a view similar to FIG. 12, showing the base of the safety switch of the invention installed on a portion of a vehicle spaced from a single control pedal;

FIG. 14 is an exploded view showing another embodiment of a safety switch according to the present invention;

FIG. 15 is a cross-sectional view of the safety switch shown in FIG. 14; and

FIG. 16 is a cross-sectional view of still another embodiment of a safety switch according to the present invention in which the switch lever means comprises a pulley-like member.

In the drawings, FIG. 1 shows a portion of an automotive vehicle including a fire wall or dash panel 10, structural members 11 and 12, and a pedal lever 13 pivoted from above at a point 14 and supporting at its lower end a pedal 16 which may be either the clutch or the brake pedal of the automobile. Affixed to the pedal lever 13 is a combination vacuum and electric safety switch 17 for a speed control system incorporated in the vehicle. As discussed above, the switch 17 is adapted to open an electric circuit which includes lead wires 18 and 19 connected to the speed control regulator apparatus (not shown) of the system, and also to dump vacuum associated with the speed control system by opening a vacuum line 21 to the atmosphere. As discussed above, the opening of the electric circuit may effect the closing of a valve in a vacuum source line (not shown). A modulating air bleed valve associated with the regulator would then be effective to vent the system's vacuum chamber to atmosphere, since source vacuum would be shut off. In other type systems, the electric circuit may be otherwise connected to vent the vacuum chamber to atmospheric pressure.

A tension line 22, which may comprise a bead chain, is connected at one end to the fire wall 10 or other fixed part of the vehicle, and at the other end to a switch lever 23. The switch lever 23 is in the operational position shown in FIG. 1 when the pedal lever 13 is in its full outward position as shown, urged by a return spring 24 against a stop 26. The length of the bead chain 22 is so adjusted that in this pedal position it is taut, pulling the pivoted switch lever 23 to a position rotated counterclockwise and appearing to the right as viewed in FIGS. 1, 8 and 11. The switch lever 23 is biased, as will be seen below, toward a position rotated clockwise from that shown in FIG. 1 or FIG. 11. The positions of the bead chain 22 and switch lever 23 when the pedal 16 is fully depressed are shown in dashed lines in FIG. 1 and in solid lines in FIG. 8.

FIGS. 2 through 6 show a universal mounting bracket attached to the safety switch 17 for accommodating a number of different sizes and shapes of automobile pedal levers. As shown in FIG. 6, the universal mount, generally identified by the reference number 27, includes an L-shaped bracket 28 affixed to the safety switch 17 by rivets 29 or other means. The bracket 28 has in its shorter leg 31 a slot shaped opening 32 parallel to the width of the leg 31 for receiving an end of an engaging member 33. The other end of the engaging member 33 may then be drawn toward the longer leg 34 of the bracket 27 by a bolt 36. The bolt 36 passes through one of the two holes 37 and 38 in the ends 39 and 40, respectively, of the engaging member 33 and may be received in a threaded connection with a tapped hole 41 in the leg 34. Alternatively, a nut (not shown) may be provided on the other side of the leg 34, with the hole 41 sized to allow the bolt to pass through.

As seen in FIG. 2, wherein the universal mount 27 is shown in one manner of assembly clamped onto a pedal lever 13a, the first end 39 of the engaging member 33 is parallel to but offset a certain distance from the second end 40. A middle section 42 of the member 33 is further offset from but parallel to both the ends 39 and 40 so that, in the assembly configuration of FIG. 2, it lies closest to the longer leg 34 of the L-shaped bracket 28, while the second end 40 of the member 33 lies farthest away from the leg 34 and the first end 39 lies a distance intermediate the other distances from the leg 34. This enables the universal mount 27, when assembled as shown in FIG. 2, to accommodate a relatively thick pedal lever 13a.

FIG. 4 shows how the universal mount 27 can be assembled to clamp onto a thinner pedal lever 13b. In this assembly, the second engaging member leg 40 is received in the bracket slot 32 while the first end 39 is used for the bolt connection with the longer leg 34 of the bracket 28. This brings the middle section 42 of the member 33 closer to the bracket leg 34 than in the assembly of FIG. 2.

FIG. 3 shows another manner of assembly of the universal mount 27. In this assembly, a pedal lever 13c of thicker cross section than that shown in FIG. 2 is received in a clamping connection between the engaging member 33 and the L-shaped bracket 28. A pedal lever 13c of this width and thickness is generally of a tubular cross section as shown. The engaging member 33 is assembled similarly to the manner shown in FIG. 2 but turned over so that the middle section 42 of the member 33 is more distant from the bracket leg 34 than either of the two ends 39 and 40.

FIG. 5 shows a fourth manner of assembly of the universal mount 27. In this assembly a tubular pedal lever 13d of even greater thickness is received in a clamped connection between the middle section 42 of the engaging member 33 and the longer leg 34 of the L-shaped bracket 28. The assembly is similar to that shown in FIG. 4, with the second end 40 of the engaging member 33 inserted in the bracket slot 32, but with the engaging member 33 turned over so that the middle section 42 is downward as seen in FIG. 5, and more distant from the bracket leg 34 than in any of the other assemblies. FIG. 5 also indicates in dashed lines another manner in which tubular sections of various depths such as a section 13e may be engaged.

FIGS. 7 through 10 illustrate the construction of the safety switch 17. As shown in the exploded view of FIG. 7, the safety switch 17 includes a housing or base (identified as 44 in FIG. 10) consisting of a generally cup shaped portion 45 and a cover 46 which are connected together and to the bracket 28 by the fasteners 29. The cover has connected to it a nipple 47 which defines a duct or vacuum port 48 passing through the cover 46 communicating (see FIG. 9) with the interior of the assembled housing 44. The nipple 47 is for connection to a vacuum line such as the vacuum line 21 shown in FIG. 1 communicating with a speed control system incorporated in the vehicle. An opening 50 in the housing serves both to accommodate the switch lever 23 and to insure atmospheric air communication with the vacuum port 48.

Within the housing is a pivot stud 49 for receiving bores 51 and 52 in the switch lever 23 and in an insulator extension 53 which is connected to the lever 23 in the assembled safety switch 17. A torsion spring 54 is positioned in the housing, with one end 56 anchored in the cup shaped portion 45 as shown in FIG. 7, and a second end 57 for engaging both the switch lever 23 and the insulator extension 53 through holes 58 and 59, respectively, when the two components are brought together and positioned on the pivot stud 49. Thus, the spring end 57 pins the lever 23 and the insulator 53 so that they rotate as a unit. A wave washer or other type spring washer 60 may be positioned around the pivot stud 49 below the switch lever 23 to urge the lever 23, the insulator extension 53 and thus a resilient seal strip 61 toward the vacuum port 48. As indicated in FIGS. 7 and 8, the torsion spring 54 urges the switch lever 23 clockwise, and it will be seen that the maximum clockwise position of the switch lever 23, as viewed in the drawings, defines the inoperative position for the speed control system.

The lead wires 18 and 19 from an electric circuit leading to the regulator (not shown) of the automobile speed control system are connected to contacts 62 and 63, both of which may be insulatively connected to the cup-shaped portion 45 of the housing 44. If the housing 44 is metallic, at least one of the contacts 62 and 63 must be installed therefrom, but the housing is preferably of non-conductive plastic. The contact 63 is a conductive leaf spring with a contacting tip 64 which is biased away from the contact 62. The relative positions of the insulator extension 53 and the contacts 62 and 63 are shown in FIGS. 8, 9 and 10. When the switch lever 23 and the connected insulator extension 53 are rotated in a counterclockwise direction, against the bias of the torsion spring 54, by the bead chain 22 or tension line 72 (see FIGS. 1, 8 and 11), the edge of the insulator extension 53 engages the leaf spring contact 63 to cam it into engagement with the contact 62, as shown in FIGS. 8, 9 and 10. However, before the contact is made, the insulator extension 53 first closes the vacuum port 48, as best seen in FIG. 10. The port 48 is preferably contacted by the seal strip 61 which is retained to the end of the insulator extension 53 and which preferably comprises a resilient material such as urethane rubber. The reason for and importance of the closing of the vacuum port 48 prior to the closing of electric circuit via the contacts 62 and 63 are discussed above. The order of closing and opening of the vacuum port 48 and the electric circuit via the contacts 62 and 63 is illustrated in FIGS. 8, 9 and 10. The lever 23 and insulator extension 53 shown in solid lines in FIG. 8, in the maximum clockwise position, represent the deactivated position for the speed control system, wherein the vacuum port 48 is vented to the atmosphere and the electric contacts 62 and 63 are opened. The dashed-line representation of the switch lever 23a and insulator extension 53a illustrates the closure of the vacuum port 48 by the seal strip 61 when the pedal lever 13 (FIG. 1) has partially returned to the undepressed position. Where the switch lever and insulator extension are shown in the maximum counterclockwise position and represented as 23b and 53b in dashed lines, the vacuum port 48 and the electric contacts 62 and 63 are both closed, corresponding to the full outward position of the pedal lever 13. The lever 23 is of course pivoted in the counterclockwise direction by the pull of the bead chain 22 or tension line 72 (FIG. 11) against the bias of the torsion spring 54.

As shown in FIG. 8, the bead chain 22 may be connected to one of two holes 65 and 66 in the end of the lever 23 by a cotter pin 67 inserted over the chain, between beads, and through the holes. The holes 65 and 66 are preferably one and one-half bead spacings apart to facilitate proper adjustment of the chain 22 upon installation (see also FIGS. 2 and 3).

When the clutch or brake pedal 16 is depressed and the pedal lever 13 is moved inwardly, the switch lever 23 and insulator extension 53 are returned to the full clockwise position by the relaxation of the bead chain 22 and the urging of the torsion spring 54. First the electric contacts 62 and 63 are opened, as illustrated in FIGS. 8 and 10, then the vacuum port 48 is vented to the atmosphere.

FIG. 11 shows an arrangement by which the safety switch 17 of the invention may be installed in an automobile having a standard transmission. A single safety switch 17 may be mounted on either the clutch or brake pedal lever 70 or 71, being shown on the brake lever 71 in FIG. 11. To the switch lever 23 is attached the flexible but nonextensible line 72, which passes through a pulley or a low friction grommet 73 retained in a bracket 74 connected to the fire wall, dash panel or other fixed member 75 of the vehicle. The other end of the line 72, which is taut when the pedals are both in their normal, fully extended positions shown, is connected to the other pedal lever 70. The line connections to the levers 70 and 71 may be made by any suitable means, but one connection should be adjustable on installation so that the line 72 is taut as shown. As can be seen from FIG. 11, if either the clutch or brake pedal is depressed, the switch lever 23 will be rotated by its torsion spring (see FIGS. 7 and 8) in a clockwise direction, thereby opening the electric circuit and the vacuum valve to shut off the speed control system.

FIGS. 12 and 13 show arrangements wherein the base of the safety switch 17 is mounted on, for example, the fire wall of a vehicle. FIG. 12 shows a standard transmission car wherein a tension line 80 is connected by a universal clamp 81 to a brake pedal lever 82. The tension line 80 extends through a grommet or pulley 83 located in the switch lever 23. The other end of the tension line 80 is connected to a clutch pedal lever 84. As described above, if either the clutch or brake pedal levers 84, 82 is depressed, the spring-biased switch lever 23 opens the electrical circuit and the vacuum valve to shut off the speed control system.

FIG. 13 discloses a similar embodiment, showing a one-pedal arrangement, with the base of the switch 17 mounted on the fire wall. One end of a bead chain 87 is connected to a pedal lever 88. The other end of the bead chain 87 is connected to the switch lever 23. Again, depression of the pedal lever 88 allows movement of the spring biased switch lever 23 to open the electrical circuit and open the vacuum valve to shut off the speed control system.

It should be noted that the details of construction of the safety switch 17 can be modified considerably without departing from the invention. For example, the electrical contacts 62 and 63 can be located on the opposite side of the housing 44 for engagement by the opposite end of the lever 23, with appropriate insulation. Similarly, the tension chain 22 can be attached to the other end of the lever 23, with an appropriate extension and an opening in the housing to accommodate the extension.

Another embodiment of a switch, according to the present invention, is generally indicated by the reference number 90 in FIGS. 14 and 15. The switch base may be mounted either upon a panel, such as a fire wall, or in the alternative on a vehicular pedal. In both the embodiments shown in FIGS. 14, 15 and 16, if the switch bases are mounted on the pedal, it is usually preferable to have the hose nipple for the vacuum line located on the rotating member and the seal strip for closing the vacuum opening located on the stationary member. However, in connection with both of the FIG. 14 and FIG. 16 embodiments, they will be described for mounting the bases on a panel, such as a fire wall.

The switch 90 includes a cup-shaped base member 91 which defines a circumferential groove 92. A hose nipple 93 includes a valve opening 94 located on the interior of the base member 91. The hose nipple 93 receives a vacuum line 95. A partition 96 defines a curved spring groove 97 which receives a compression spring 98. A pair of electrical contacts 99 and 100 are in electrical communication with lead wires 101 and 102, respectively. In the present embodiment, the cup-shaped base member 91 also includes a pair of leveling pads 103 and a pivot stud 104. A mounting bracket 115 may be attached to the rear of the base member 91, for example, by rivets. A cover member 105 having a lever arm 106 is rotatably mounted on the pivot stud 104. The lever arm 106 is positioned for rotation within the groove 92. A lock fitting 107 retains the cover member 105 on the pivot stud 104. A seal strip 108 is mounted on the inner surface of the cover member 105 and is in a complementary relationship with the valve opening 94 whereby spring bias rotation of the cover member 105 disengages the seal strip 108 from the valve opening 94 and opens the vacuum circuit. Similarly, an electrical plate, for example an arcuately shaped copper plate, 109, is in complementary relationship with the electrical contacts 99 and 100. Again, spring bias rotation of the cover member 105 opens the electrical circuit. A spring compressor lug 110 depends from the cover member 105 and is received in the spring groove 97. The compression spring 98 continuously urges the cover member 105 to rotate by placing a spring force on the spring compression lug 110. As explained above, with respect to the earlier embodiments, a tension line or bead chain (not shown) is connected to the outer end of, for example, the lever arm 106. Such bead chain or tension line until released applies a counteracting force opposed to the force of the compression spring 98.

Another embodiment of a switch according to the present invention is shown in cross section in FIG. 16. This embodiment is very similar to the embodiment shown in FIGS. 14 and 15, however, a cover 112 is mounted on the pivot stud 104. The cover 112 is in the shape of a pulley and includes, for example, a bead chain opening 113. Therefore, the entire pulley-like cover 112 and particularly the radial portion extending between the pivot stud 104 and the bead chain opening 113 serves as a lever arm or lever means. In a manner similar to the above-described embodiments, the compression spring (not shown) urges the cover pulley 112 in a direction which tends to open the vent valve 94 and the electrical contacts 99 and 100. The bead chain 116 which is engaged in the bead chain opening 113 applies an opposite force while under tension.

Other modifications to this preferred embodiment can also be made without departing from the spirit and scope of the invention as defined in the appended claims.

The embodiments of the invention in which an exclusive property or privilege is claimed are defined as follows:

1. A combination vacuum valve and electric circuit switch for use with a vehicle speed control apparatus including a movable control member and a vacuum operated control system, such system requiring deactivation when said control member is moved from its normal operating position, said switch comprising:
    a base;
    a switch lever rotatably mounted to said base and adapted to be rotated between an inoperative and an operative position;
    a stationary vacuum port, adapted to be connected with such control system, adjacent said switch lever positioned to be covered by said switch lever when the switch lever rotates toward the operative position, and uncovered when the switch lever rotates away from the operative position;
    a pair of electric contacts adapted to be connected with such speed control apparatus adjacent said base, and means for closing the contacts after the covering of the port as the switch lever rotates toward the operative position, and for opening the contacts before the port is uncovered as the switch lever rotates away from the operative position;
    spring means mounted within said base and biasing the switch lever toward the inoperative position; and
    flexible cable means connected to said switch lever and adapted to be connected to such control member for rotating said switch lever to its operative position when the movable control member assumes its normal operating position.

2. The apparatus of claim 1 wherein said means for closing and opening the electric contacts comprises an electrically conductive leaf spring affixed at one end to said base with an opposite end forming one of the electric contacts and positioned directly over the other electric contact for spring-flexing engagement therewith, said leaf spring being positioned in the path of travel of an end of said switch lever and including a portion oriented at an oblique angle to such path so that as said end of said switch lever moves toward the operative position, the leaf spring is cammed by said end of the switch lever toward and into engagement with said other electric contact.

3. The apparatus of claim 1 wherein said means for closing and opening the electrical contacts comprises a conductor plate mounted for rotation with said switch lever means.

4. The apparatus of claim 1 wherein said switch lever has a sealing member thereon, said sealing member being in a complementary relationship with said port.

5. The apparatus of claim 1, wherein said spring means comprises a torsion spring operatively connected between said switch lever and said base.

6. The apparatus of claim 1, wherein said spring means comprises a compression spring operatively connected between said switch lever and said base.

7. A combination vacuum valve and electric circuit switch for use with a vehicle speed control apparatus including a movable control member and a vacuum operated control system, such system requiring deactivation when said control member is moved from its normal operating position, said switch comprising:
    a base having a pivot stud;
    a switch lever rotatably mounted on said stud and adapted to be rotated between an inoperative and an operative position;
    a resilient seal strip on said switch lever;
    a stationary vacuum port, adapted to be connected with such control system, adjacent said switch lever positioned to be covered by said seal strip when the switch lever rotates toward the operative position, and uncovered when the switch lever rotates away from the operative position;
    a pair of electrical contacts adapted to be connected with such speed control apparatus adjacent said base, and means for closing the contact after the covering of the port as the switch lever rotates toward the operative position, and for opening the contacts before the port is uncovered as the switch lever rotates away from the operative position, said means for closing and opening the electric contacts including an electrically conductive leaf spring affixed at one end to said base with an opposite end forming one of the electric contacts and positioned directly over the other electric contact for spring-flexing engagement therewith, said leaf spring being positioned in the path of travel of said switch lever and including a portion oriented at an oblique angle to such path so that as said switch lever moves toward the operative position, said leaf spring is cammed by said switch lever toward and into engagement with said other electric contact; and flexible cable means connected to said switch lever and adapted to be connected to such control member for rotating said switch lever to its operative position.

8. The apparatus of claim 7 including second spring means positioned adjacent said pivot stud for urging said switch lever and said seal strip away from said vacuum port.

* * * * *